UNITED STATES PATENT OFFICE.

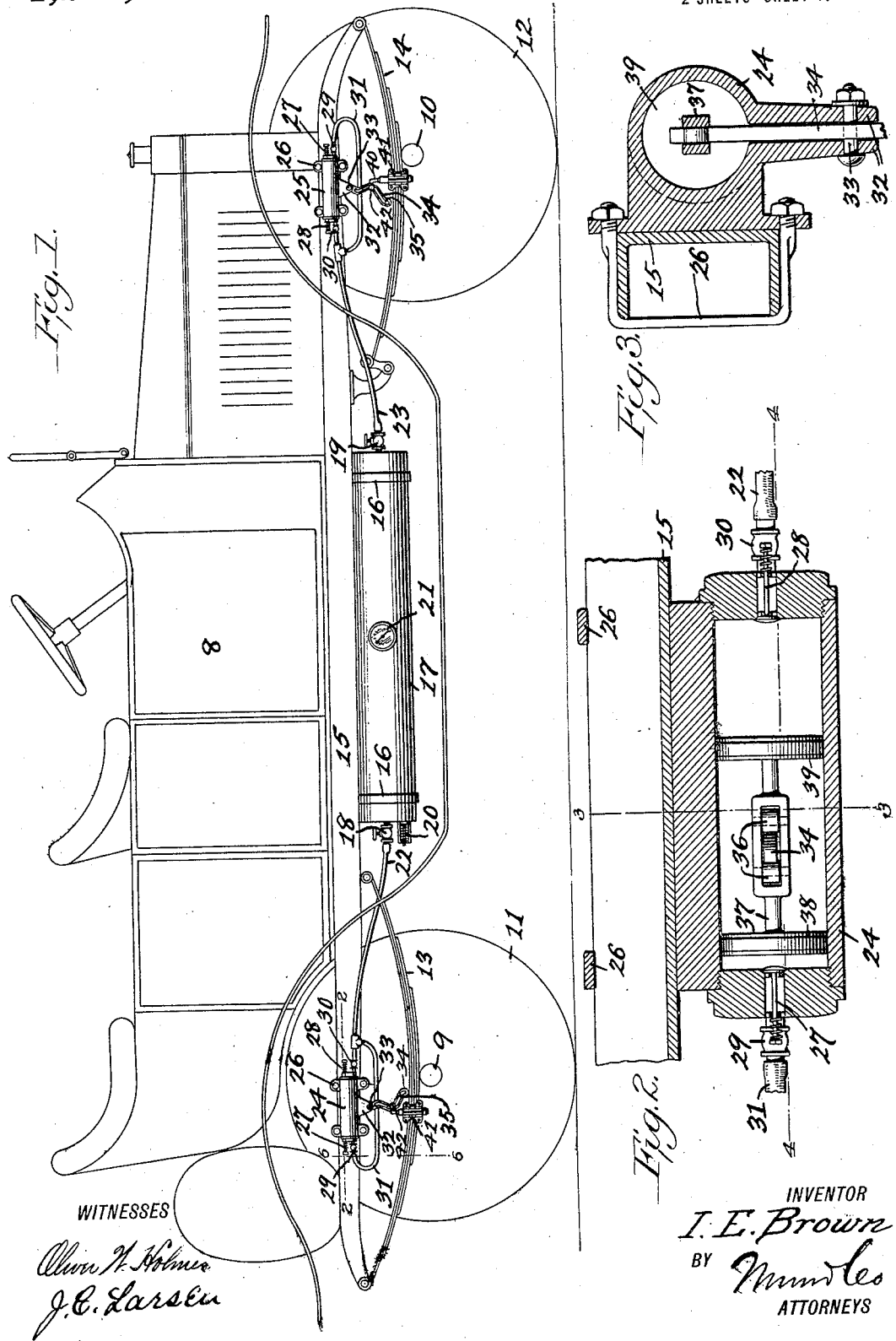

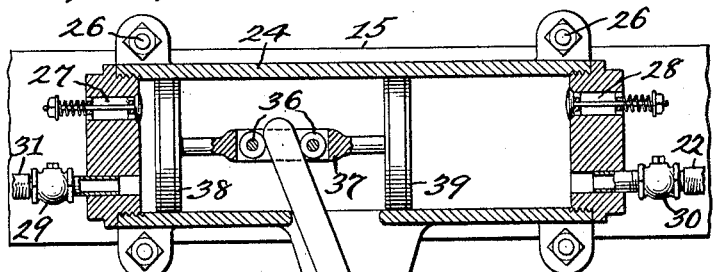
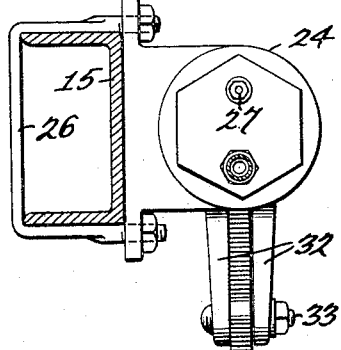
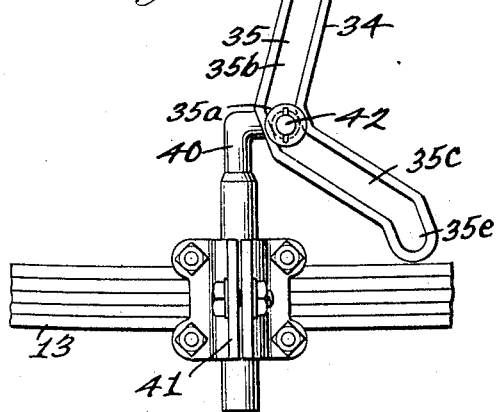
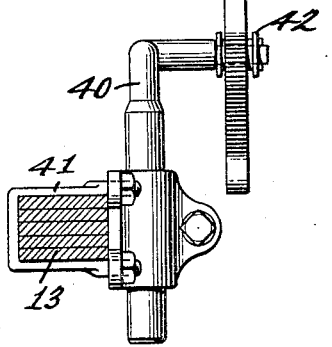
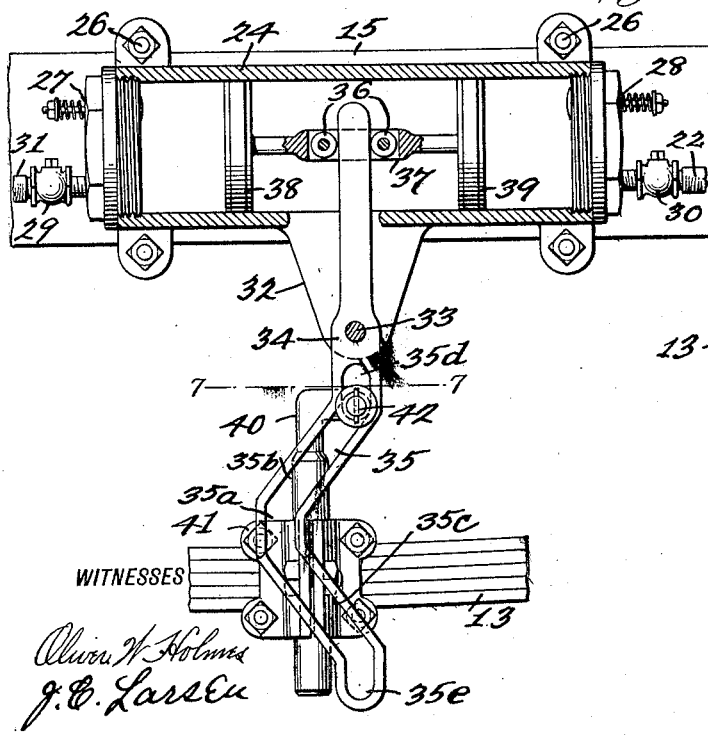
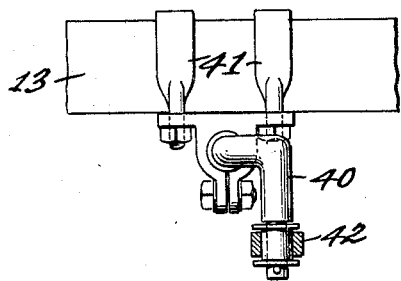

IRA ELLSWORTH BROWN, OF FORT STOCKTON, TEXAS.

MECHANISM FOR OPERATING AIR-COMPRESSORS, &c.

1,243,586.   Specification of Letters Patent.   Patented Oct. 16, 1917.

Application filed May 26, 1916.   Serial No. 99,993.

*To all whom it may concern:*

Be it known that I, IRA ELLSWORTH BROWN, a citizen of the United States, and a resident of Fort Stockton, in the county of Pecos and State of Texas, have invented certain new and useful Improvements in Mechanism for Operating Air-Compressors, &c., of which the following is a specification.

My invention relates to mechanism for operating air compressors operable by the vertical movement of a vehicle body with respect to its axles, and which also acts as a shock absorber for said body, and the main object thereof is to provide such a device which is readily applied to an existing automobile without change in the latter, which allows a degree of vertical movement of the body without actuating the compressor, which is simple in construction and installation, which is composed of few parts not likely to get out of order, and which stores the compressed air ready for use for tire inflation, for air starters for automobiles, for air-brakes, for cleaning the dust from the automobile, etc.

My invention is fully described in the following specification, of which the accompanying drawings form a part, in which like characters refer to like parts in each of the views, and in which:—

Figure 1 is a side elevation of an automobile provided with my invention;

Fig. 2 is an enlarged section taken on the line 2—2 of Fig. 1;

Fig. 3 is a section taken on the line 3—3 of Fig. 2;

Fig. 4 is a section taken on the line 4—4 of Fig. 2 and showing the duplex transmitting lever in normal position;

Fig. 5 is a similar view but showing said lever in one of the two air pumping positions;

Fig. 6 is an enlarged section taken on the line 6—6 of Fig. 1; and

Fig. 7 is a view of a detail shown in Figs. 4 and 5.

Referring to the drawings, 8 represents the body of an automobile having axles 9 and 10 and wheels 11 and 12, being the rear and front axles and wheels, respectively, springs 13, and 14, shown as semi-elliptic in the illustrations although they may be of any form, being interposed between the respective axles and frame 15.

Secured to the frame 15, as by straps 16, is an air-tank 17 provided with air inlets at the ends thereof controlled by check-valves 18 and 19, with a safety-valve 20, and with a pressure-gage 21, flexible tubes 22 and 23 leading rearwardly and forwardly of the respective check-valves to rear and front air pump cylinders 24 and 25 secured to the frame 15 by means of clamps 26, Fig. 3, above the respective axles 9 and 10.

Each pump cylinder is provided with air inlet valves 27 and 28, at opposite ends thereof, and with outlets controlled by check-valves 29 and 30 at opposite cylinder ends, the former of which is connected with a flexible tube 31 in turn joined to the respective flexible tube 22 or 23 of the tank 17 and the latter of which is connected directly with the respective tube 22 or 23, thus connecting both ends of the rear pump 24 with the rear end of the tank 17 and connecting both ends of the forward pump 25 with the forward end of said tank.

Each pump cylinder is provided with downwardly directed arms 32 jointly carrying a pivot bolt 33 arranged beneath the central vertical longitudinal and central vertical transverse axes of the respective cylinder, and at some distance thereunder, these pivot bolts serving, each, as the fulcrum of a duplex transmitting lever 34 provided with a slot 35 in its lower end and the upper end of which is extended into the respective cylinder between two thrust rollers 36 carried by a rod 37 connecting two pistons 38 and 39 within the respective cylinder.

Each spring, 13 and 14, has a bracket 40 held thereon by means of clamps 41 of any desired form and which brackets carry antifriction rollers 42 arranged within the respective slots 35 to permit vertical movement of the respective levers and rollers with respect to each other.

Each slot 35 comprises a central portion 35ᵃ in one plane joined by means of oppositely inclined portions 35ᵇ and 35ᶜ with two longitudinally arranged portions 35ᵈ and 35ᵉ in the same plane and which plane is parallel to the plane of the central portion 35ᵃ.

The rear lever 34 and connected parts is shown in Figs. 4 and 5, being in the normal position in the former with the lever 34 inclined and the roller 42 at rest in the portion 35ᵃ of the slot 35. In this position a degree of vertical movement is possible, upwardly or downwardly, to either the automobile frame or the axle 9 without materially moving the lever 34 from its normal position. If, however, the frame and axle approach each other more closely the roller 42 enters the portion 35$^b$ and swings the lever on its fulcrum, and upon a still closer approach of the frame and axle said roller enters the portion 35$^d$ of the slot and may move vertically therein without pumping effect, this being shown in Fig. 5.

This lever movement is also true if the frame and axle are separated from the normal relative positions because of the portions 35$^c$ and 35$^e$ of the slot, and the pistons 38 and 39 are thus reciprocated within the rear cylinder by this lever actuation, thereby drawing in air at one end of the cylinder and forcing it out of the opposite end alternately into the tank 17 in the relative movements of the frame and axle toward or from each other for predetermined distances greater than the limit of movement of the roller 42 in the portion 35$^a$.

It will thereby be seen that air is thus pumped into the tank 17 under pressure in the degree of movement of the frame and axle with respect to each other, and this pumping is true not only for the rear pump cylinder but also for the front pump cylinder, as the construction, operation, and function of both are identical, and the safety valve 20 controls the pressure within the tank 17 and this pressure is readable on the gage 21.

Inasmuch as this pumping of air is done under pressure, a cushion of air results between the frame of the automobile and each axle which serves as a shock absorber, and the air in the tank 17, under pressure, may be led to any desired point of use by means of a suitable flexible conductor, not shown.

My device is intended for use at both sides of a vehicle, above each end of each axle, although this is arbitrary as I may only use the device at one axle, as for instance the rear where the greatest load is carried and, as will be obvious, I may make the parts of any suitable materials and mount them on the vehicle in any suitable manner.

Having fully described my invention, what I claim as new, and desire to secure by Letters Patent, is:—

1. In a device of the character described a lever having a fixed fulcrum and having one end adapted to have a rocking connection with a movable element, the opposite end of said lever carrying a slotted element, the slot thereof consisting of parallel central and end portions disposed in parallel planes, and diverging intermediate portions merging with the central and end portions, said slot adapted to receive a member projecting from the running gear of a vehicle and capable of movement in one direction only, whereby said lever may be rocked in two directions.

2. A lever for shock absorbers consisting of a straight end portion carrying a fulcrum, the other end portion having a guideway, said guideway comprising a central and end sections lying in parallel planes, and oppositely diverging intermediate sections connecting said central and end sections, said guideway adapted to receive a projection adapted to travel in said guideway, said projection having only a vertical movement to rock said lever on entering said divergent sections.

IRA ELLSWORTH BROWN.

Copies of this patent may be obtained for five cents each, by addressing the "Commissioner of Patents, Washington, D. C."